(12) United States Patent
Albert et al.

(10) Patent No.: US 11,720,727 B2
(45) Date of Patent: Aug. 8, 2023

(54) METHOD AND SYSTEM FOR INCREASING THE RESOLUTION OF PHYSICAL GRIDDED DATA

(71) Applicants: Terrafuse, Inc., San Francisco, CA (US); Hunter Connell, San Francisco, CA (US)

(72) Inventors: Adrian Albert, San Francisco, CA (US); Brian White, San Francisco, CA (US); Alok Singh, Berkeley, CA (US); Ashray Manepalli, San Jose, CA (US); Mayur Mudigonda, Berkeley, CA (US)

(73) Assignee: Terrafuse, Inc., San Francisco, CA (US)

( * ) Notice: Subject to any disclaimer, the term of this patent is extended or adjusted under 35 U.S.C. 154(b) by 419 days.

(21) Appl. No.: 17/092,291

(22) Filed: Nov. 8, 2020

(65) Prior Publication Data

US 2021/0064802 A1    Mar. 4, 2021

Related U.S. Application Data

(63) Continuation-in-part of application No. 16/550,234, filed on Aug. 25, 2019, now Pat. No. 11,205,028.

(Continued)

(51) Int. Cl.
*G06F 30/27* (2020.01)
*G06F 111/04* (2020.01)
(Continued)

(52) U.S. Cl.
CPC .......... *G06F 30/27* (2020.01); *G06F 2111/04* (2020.01); *G06F 2111/08* (2020.01); *G06F 2111/10* (2020.01)

(58) Field of Classification Search
CPC .. G06F 30/27; G06F 2111/04; G06F 2111/08; G06F 2111/10
See application file for complete search history.

(56) References Cited

U.S. PATENT DOCUMENTS 6,581,008 B2    6/2003    Intriligator et al.
9,009,087 B1    1/2015    Mewes et al.
(Continued)

OTHER PUBLICATIONS

Albert, A., Kaur, J. and Gonzalez, M.C., Aug. 2017. Using convolutional networks and satellite imagery to identify patterns in urban environments at a large scale. In Proceedings of the 23rd ACM SIGKDD international conference on knowledge discovery and data mining (pp. 1357-1366). (Year: 2017).*

(Continued)

*Primary Examiner* — Chuen-Meei Gan
(74) *Attorney, Agent, or Firm* — Brian R. Short

(57) ABSTRACT

Apparatuses, methods, and systems for increasing a spatial resolution of gridded spatial-temporal data on weather and climate-related physical variables are disclosed. One method includes obtaining weather and climate data including at least a coarse resolution and a fine resolution, or observational data that includes physical data, pre-processing the weather and climate data, training one or more probabilistic downscaling mapping functions of the at least one of the gridded numeric simulation data or the observational data comprising applying interpolation filters to successively interpolate the pre-processed weather and climate data to generate output data having a resolution that is equal to the fine resolution, and generating high-resolution physical parameters for at least one of a plurality of applications utilizing the trained probabilistic downscaling mapping functions receiving different weather and climate input data that has different times or locations than the pre-processed weather and climate data used in the training.

18 Claims, 11 Drawing Sheets

Related U.S. Application Data

(60) Provisional application No. 62/933,386, filed on Nov. 9, 2019, provisional application No. 62/727,992, filed on Sep. 6, 2018, provisional application No. 62/728,000, filed on Sep. 6, 2018.

(51) Int. Cl.
*G06F 111/08* (2020.01)
*G06F 111/10* (2020.01)

(56) References Cited

U.S. PATENT DOCUMENTS

| | | |
|---|---|---|
| 2010/0179930 A1 | 7/2010 | Teller et al. |
| 2017/0061050 A1 | 3/2017 | Mewes et al. |
| 2017/0131435 A1 | 5/2017 | Peacock et al. |
| 2017/0329048 A1* | 11/2017 | Lemos ............... G06Q 10/04 |
| 2018/0188417 A1* | 7/2018 | Spatzierer ............ G01W 1/10 |
| 2019/0206090 A1 | 7/2019 | Ray et al. |
| 2020/0125956 A1 | 4/2020 | Ravi et al. |

OTHER PUBLICATIONS

Albert, A, Kaur, J and Gonzalez, M.C., Aug. 2017. Using convolutional networks and satellite imagery to identify patterns in urban enviroments at a large scale, In Proceedings of the 23rd ACM SIGKDD international conference on knowledge discovery and data mining (pp. 1357-1366). (Year 2017).

Albert, A, Kaur, J, Strano, E. and Gonzalez, M. 2019. Spatial sensitivity analysis for urban land use prediction with physics-constrained conditional generative adversarial networks, asXiv preprint asXiv: 1907.09543. (Year: 2019).
U.S. Appl. No. 16/550,234, Office Action dated Jun. 15, 2021.
Image-to-Image Translation with Conditional Adversarial Networks, Phillip Isola, Jun-Yan Zhu, inghui Zhou, Alexei A. Efros, Nov. 26, 2018.
Super SloMo: High Quality Estimation of Multiple Intermediate Frames for Video Interpolation; Huaizu Jiang, Deqing Sun, Varun Jampani, Ming-Hsuan Yang, Erik Learned-Miller, Jan Kautz, Jul. 13, 2018.
Modeling Urbanization Patterns With Generative Adversarial Ne Tworks, Adrian Albert, Emanuele Strano, Jasleen Kaur, Marta Gonzalez, Jan. 8, 2018.
Augmented CycleGAN: Learning Many-to-Many Mappings from Unpaired Data; Amjad Almahairi, Sai Rajeswa, Messandro Sordoni, Philip Bachman, Aaron Courville, Jun. 18, 2018.
Neural Ordinary Differential Equations, Ricky T. Q. Chen, Yulia Rubanova, Jesse Bettencourt, David Duvenaud, Jan. 15, 2019.
ESRGAN: Enhanced Super-Resolution Generative Adversarial Networks, Xintao Wang, Ke Yu, Shixiang Wu, Jinjin Gu, Yihao Liu, Chao Dong2, Chen Change Loy, Yu Qiao, Xiaoou Tang, Sep. 17, 2018.
A Style-Based Generator Architecture for Generative Adversarial Networks, Tero Karras, Samuli Laine, Timo Aila, Mar. 29, 2019.
Generating Long Sequences with Sparse Transformers, Rewon Child, Scott Gray, Alec Radford, Ilya Sutskever, Apr. 23, 2019.
DeepDecision: A Mobile Deep Learning Framework or Edge Video Analytics, Xukan Ran, Haoliang Chen, Xiaodan Zhu, Zhenming Liu, Jiasi Chen.

* cited by examiner

Obtaining weather and climate data, the weather and climate data including at least one of gridded numerical simulation data having at least two spatial resolutions including at least a coarse resolution and a fine resolution, or observational data that includes at least one source of sensed physical data, wherein at least one of the gridded numerical simulation data or the observational data include weather and climate-related data
1010

Pre-processing the weather and climate data
1020

Training one or more probabilistic downscaling mapping functions of the at least one of the gridded numeric simulation data having at least two spatial resolutions or the observational data comprising applying interpolation filters to successively interpolate the pre-processed weather and climate data to generate output data having a resolution that is equal to the fine resolution
1030

Generating high-resolution physical parameters for at least one of a plurality of applications utilizing the trained probabilistic downscaling mapping functions receiving different weather and climate input data that has different times or locations than the pre-processed weather and climate data used in the training
1040

FIGURE 10

METHOD AND SYSTEM FOR INCREASING THE RESOLUTION OF PHYSICAL GRIDDED DATA

RELATED APPLICATIONS

This patent application claims priority U.S. Patent Application Ser. No. 62/933,386, filed Nov. 9, 2019. Further, this patent application is a continuation-in-part (CIP) of U.S. patent application Ser. No. 16/550,234 filed Aug. 25, 2019, which claims priority to U.S. Patent Application Ser. No. 62/727,992, filed Sep. 6, 2018 and claims priority to U.S. Patent Application Ser. No. 62/728,000, filed Sep. 6, 2018, which are herein incorporated by reference.

GOVERNMENT SUPPORT

This invention was made with Government support under contract FA86492099108 awarded by the United States Air Force. The Government has certain rights in the invention.

FIELD OF THE DESCRIBED EMBODIMENTS

The described embodiments relate generally to physical systems. More particularly, the described embodiments relate to systems, methods and apparatuses for estimating physical parameters of a physical system based on a model of the spatial-temporal dynamics of physical processes, and increasing a resolution of physically gridded data.

BACKGROUND

The current paradigm in environmental computational fluid dynamics (CFD) is process-driven simulation: known laws encoded in systems of coupled partial differential equations (PDEs) are solved over space and time via numerical schemes. Generating a single hypothesis of the spatial-temporal evolution of a realistic system over a realistic domain (e.g., hourly wildfire spread or air pollution dynamics for a city) is extremely compute-intensive. Data assimilation in process based models is highly compute-intensive and incorporates only 2-5% of the volume of ever increasing remote-sensing observations. Moreover, realistic process-based models cannot be deployed on modern edge devices, because of severe memory, power consumption, and data transmission constraints. Thus, they cannot be used for in-the-field decision making with harsh conditions that limit cloud connectivity (e.g., wildfire first response).

Thus, it is desirable to have methods, apparatuses, and systems for estimating physical parameters of a physical system based on models that emulate the complex spatial-temporal dynamics of numerical physics models, yet employ highly efficient computational architectures to perform these estimations, deployable on a variety of computing devices.

SUMMARY

An embodiment includes a method for (downscaling) increasing a spatial resolution of gridded spatial-temporal data on weather and climate-related physical variables. The method includes obtaining weather and climate data, the weather and climate data comprising at least one of gridded numerical simulation data having at least two spatial resolutions including at least a coarse resolution and a fine resolution, or observational data that includes at least one source of sensed physical data, wherein at least one of the gridded numerical simulation data or the observational data include weather and climate-related data, pre-processing the weather and climate data, training one or more probabilistic downscaling mapping functions of the at least one of the gridded numeric simulation data having at least two spatial resolutions or the observational data comprising applying interpolation filters to successively interpolate the pre-processed weather and climate data to generate output data having a resolution that is equal to the fine resolution, and generating high-resolution physical parameters for at least one of a plurality of applications utilizing the trained probabilistic downscaling mapping functions receiving different weather and climate input data that has different times or locations than the pre-processed weather and climate data used in the training.

Another embodiment includes a system for increasing a spatial resolution of gridded spatial-temporal data on weather and climate-related physical variables. The system includes a plurality of sensors, sensing physical data, one or more computing devices connected through a network to the plurality of sensors, and memory. The memory includes instructions that, when executed by the one or more computing devices, enables the system to obtain weather and climate data, the weather and climate data comprising at least one of gridded numerical simulation data having at least two spatial resolutions including at least a coarse resolution and a fine resolution, or observational data that includes at least one source of sensed physical data, wherein at least one of the gridded numerical simulation data or the observational data include weather and climate-related data, pre-process the weather and climate data, train one or more probabilistic downscaling mapping functions of the at least one of the gridded numeric simulation data having at least two spatial resolutions or the observational data comprising applying interpolation filters to successively interpolate the pre-processed weather and climate data to generate output data having a resolution that is equal to the fine resolution, and generate high-resolution physical parameters for at least one of a plurality of applications utilizing the trained probabilistic downscaling mapping functions receiving different weather and climate input data that has different times or locations than the pre-processed weather and climate data used in the training.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 10 is a flow chart that includes steps of a method for (downscaling) increasing a spatial resolution of) gridded spatio-temporal data on physical variables, according to an embodiment.

DETAILED DESCRIPTION

The embodiments described include methods, apparatuses, and systems for generating simulations of physical variables of a physical system. At least some embodiments include a computational platform for building and deploying 1) physics-informed, scalable machine learning models as compute-efficient, cost-effective, modular, data-driven "emulators" (surrogates) to expensive process (partial differential equation, PDE)-based environmental computational fluid dynamic (CFD) simulators of spatial-temporal processes represented as regular/irregular gridded data over time, and 2) highly compressed, high-fidelity versions of these emulators for embedded hardware (field programmable gate arrays (FPGAs), mobile graphic processing units (GPUs)), incorporating data transmission and power usage constraints into model design. The platform consists of a general, modular, unified machine-learning-based computational workflow, on which different models of different environmental variables can be developed. This artificial intelligence (AI)-based framework assimilates simulation data, observational (remote/ground sensing) data, and explicit physical knowledge (conservation laws, constraints) for modeling realistic spatial-temporal processes. The AI emulators described here take full advantage of the machine learning stack, including software frameworks and acceleration hardware, e.g., GPUs or tensor processing units (TPUs). Moreover, they allow 1) much faster, cost- and energy-efficient inference that is scalable to large geographical regions, much faster model development, 3) increased accuracy of risk estimates via the ability of generating a large number of scenarios, 4) easy sensitivity and what-if analysis of output variables with respect to input observational data, and 5) ability to natively incorporate a wide variety of real-time observational data.

Figure 1:
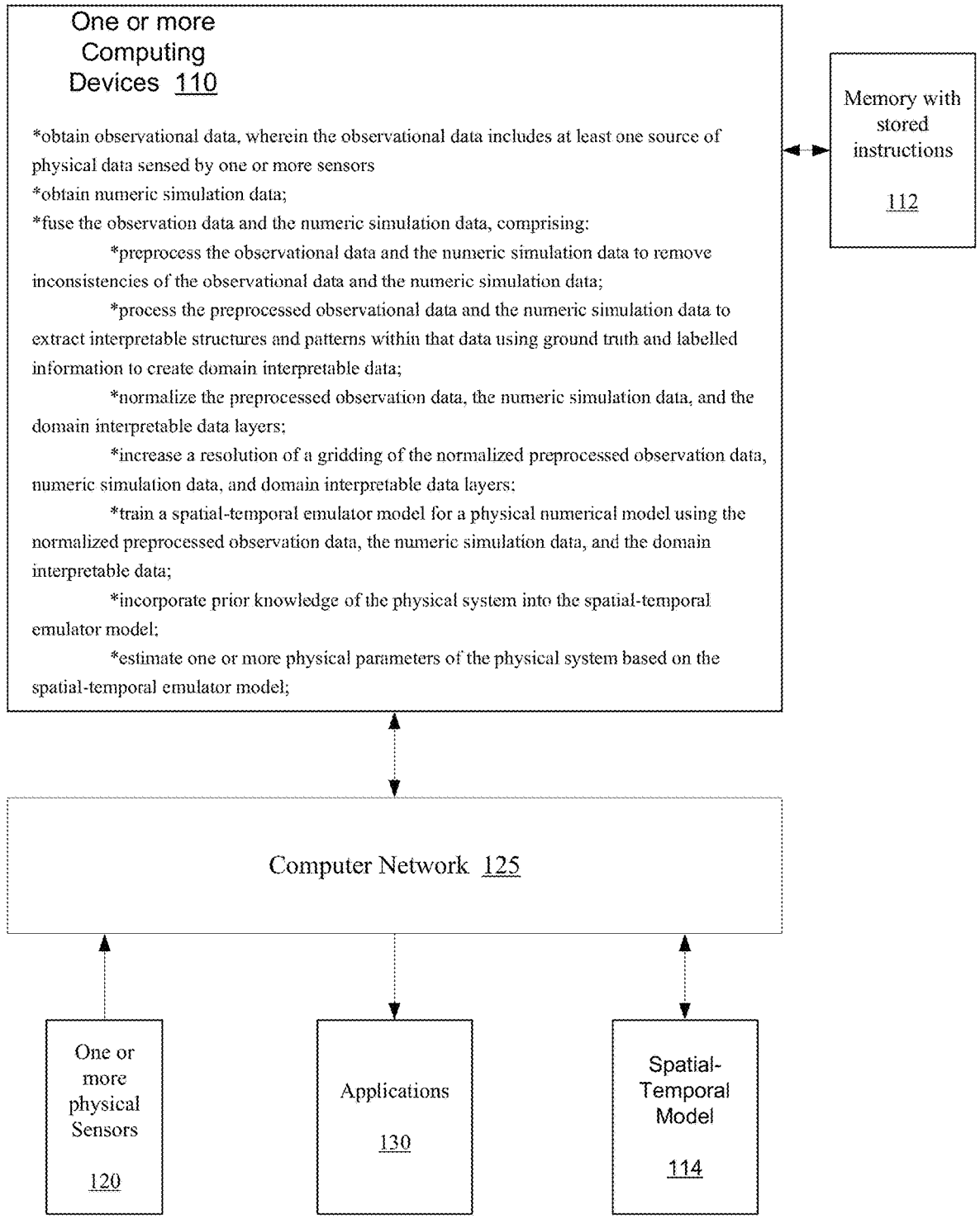
FIG. 1 shows a block diagram of a system for generating simulations of physical variables of a physical system, according to an embodiment.

FIG. 1 shows a block diagram of a system for generating simulations of physical variables of a physical system, according to an embodiment. One or more sensors 120 sense physical data that can be included within observational data. The one or more sensors 120 are connected through a network 125 to one or more computing devices 110. The sensed data includes, for example, aerial sensors, satellite sensors, cameras, moisture sensors, weather stations, and/or snow stations.

The one or more computing devices 110 operate to obtain the observational data and to obtain numeric simulation data. The numeric simulation data includes, for example, at least one of weather simulators, climate simulators, hydrology simulators, computational fluid dynamics simulators, computer game engines, or other numerical process-based simulators.

Further, the one or more computing devices 110 retrieve instructions from memory 112, which when executed cause the computing devices 110 to operate to fuse the observation data and the numeric simulation data, including preprocessing the observational data and the numeric simulation data to remove inconsistencies of the observational data and the numeric simulation data, processing the preprocessed observational data and the numeric simulation data to extract interpretable structures and patterns within that data using ground truth and labeled information to create domain interpretable data, normalizing the preprocessed observation data, the numeric simulation data, and the domain interpretable data layers, and increasing a resolution of a gridding (for an embodiment, the gridding includes spatial gridding, for an embodiment, the gridding includes temporal gridding, for an embodiment, the gridding includes spatial and temporal gridding) of the normalized preprocessed observation data, numeric simulation data, and domain interpretable data layers.

For an embodiment, fusing includes a process of bringing all data and other information such as physical constraints to the same computational workflow, for example, as afforded by a neural network. For an embodiment, fusing includes a first step of pre-processing input data to remove inconsistencies, a second step of incorporating label data to generate domain-interpretable structures and patterns (e.g., via segmentation, classification, or other supervised tasks using label information as supervision) where available, and a third step of normalizing the numerical simulation data layers, sensor data layers, and domain-interpretable data layers obtained in second step (that is, bringing these data layers to a common (e.g., tensor-based) format ingestible by downstream models.

For at least some embodiment, removing inconsistencies includes altering or otherwise eliminating a certain small subset of the data that is suspected of being detrimental to the end goal of the system. For an embodiment, this includes automatically 1) identifying and removing data samples that are corrupted (e.g., as a result of sensor error), 2) identifying and removing data samples that do not contain enough useful information or signal, 3) identifying and removing data samples that are otherwise less valuable, as indicated by domain-specific metrics.

For at least some embodiment, interpretable structures and patterns include spatially or temporally coherent renderings of subsets of the input or output data used by the platform that can be ascribed scientific or technical meaning of high degree of interest to human domain experts such as climate scientists, risk modelers, or others. For at least some embodiments, these interpretable structures and patterns are obtained by 1) training supervised or semi-supervised learning models for tasks including segmentation, classification, or regression, where the input of the models comprises at least one of the numerical simulation data, the observational sensor data, or physical knowledge and constraints, and the output of the models are the label information data, or derivations of the label information data; 2) using these trained models to perform inference, whereby the input of the trained models.

For at least some embodiments, ground truth and label information include annotations of spatially or temporally coherent structures (e.g., polygons, pixel masks, etc.) produced by humans, some of whom may be domain experts in scientific or other topics.

For at least some embodiments, domain interpretable data includes output data layers that are produced through a process that utilizes ground truth and label information to identify domain-interpretable structures and patterns.

For at least some embodiments, increasing the resolution of gridding includes a process by which data structured on a coarser grid (i.e., at even or uneven intervals in space and/or time) is brought to a refined grid by applying specific or proprietary interpolation and extrapolation techniques. For an embodiment, increasing the resolution of gridding includes 1) pre-processing the coarse-resolution input data, including numerical simulation data and observational sensor data; 2) normalizing the pre-processed coarse-resolution data; 3) applying optimized interpolation filters to successively interpolate the normalized coarse-resolution to increase the resolution of this data.

Further, the one or more computing devices 110 operate to train a spatial-temporal emulator model for a physical numerical model using the normalized preprocessed observation data, the numeric simulation data, and the domain interpretable data, and further, incorporate prior knowledge of the physical system into the spatial-temporal emulator model. For at least some embodiments, these steps include 1) setting up a model architecture design, e.g., designing the specifics of the layers and connectivity of a neural network, 2) defining an appropriate target (or fit) function that allows the parameters of the model to be optimized, 3) ingesting the processed data layers produced above into the model, 4) setting up an appropriate optimizer method for iteratively updating the model parameters until a desired level of fitness is achieved.

Further, the one or more computing devices 110 operate to estimate one or more physical parameters of the physical system based on the spatial-temporal emulator model.

Finally, the estimated one or more physical parameters are utilized for at least one of a plurality of applications 130. The computing devices can be connected to the applications through the network 125. These applications may include the control of the operation of physical devices and apparatuses, including 1) wind power turbines through wind intensity risk profile forecasting (that is, physically control the wind power turbines based on the sensed information of the sensors, and the subsequent processing to generate the estimated one or more physical parameters; 2) hydro-plants through hydropower generation risk forecasting (that is, physically control select parameters of the hydro-plants); 3) fire first response control instruments and operating systems that decide mitigation resource deployment (e.g., where to send fire trucks or where to drop water from helicopters) based on inferences about fire risk.

As will be described, at least some embodiments include the computing devices 110 retrieving a model (such a spatial-temporal model 114) through the network 125. The spatial-temporal model 114 may be an untrained model.

Figure 2:
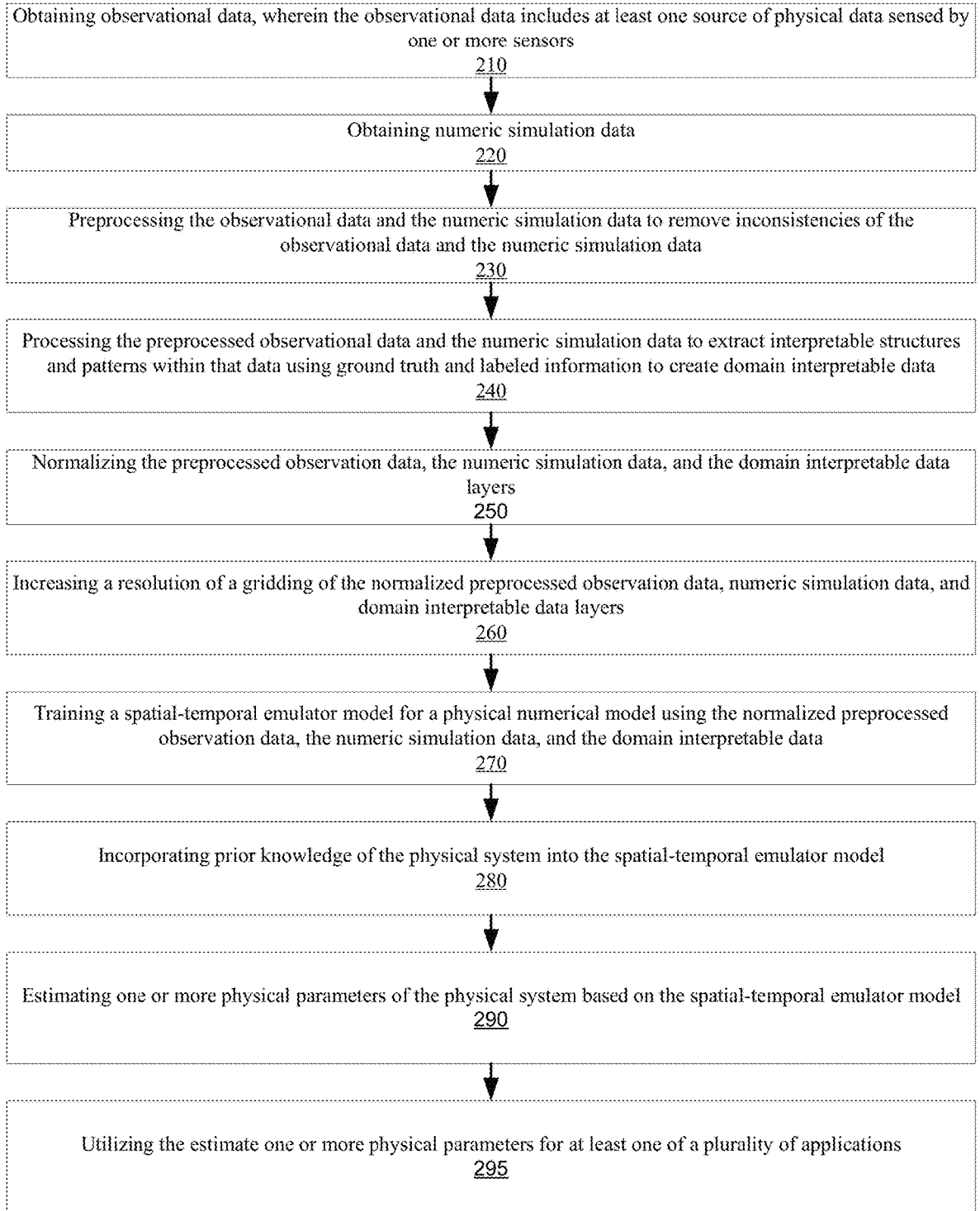
FIG. 2 is a flow chart that includes steps of a method of generating simulations of physical variables of a physical system, according to an embodiment.

FIG. 2 is a flow chart that includes steps of a method of generating simulations of physical variables of a physical system, according to an embodiment. A first step 210 includes obtaining observational data, wherein the observational data includes at least one source of physical data sensed, including one or more sensors sensing the physical data. As previously stated, the sensed data includes, for example, aerial sensors, satellite sensors, cameras, moisture sensors, weather stations, and/or snow stations. The observational data includes measurement data obtained from one or more sensors, whereby the mechanism of data acquisition and generation entails the processing of physical signals through one or more physical apparatus (for example, satellite imagery). A second step 220 includes obtaining numeric simulation data. As previously stated, the numeric simulation data includes, for example, at least one of weather simulators, climate simulators, hydrology simulators, computational fluid dynamics simulators, or computer game engines. For an embodiment, the simulation data includes data generated by running numerical simulation models, whereby certain a-priori specified processes are explicitly modeled (for example, via dynamic or statistical equations), computations are performed that calculate the evolution of these previously-specified processes over space and time, and the resulted numerical calculation data is stored by logging variables of interest sampled at certain time and space intervals.

The observation data and the numeric simulation data are fused, wherein fusing includes a third step 230 which includes preprocessing the observational data and the numeric simulation data to remove inconsistencies of the observational data and the numeric simulation data, a fourth step 240 which includes processing the preprocessed observational data and the numeric simulation data to extract interpretable structures and patterns within that data using ground truth and labeled information to create domain interpretable data, a fifth step 250 which includes normalizing the preprocessed observation data, the numeric simulation data, and the domain interpretable data layers, and a sixth step 260 which includes increasing a resolution of a gridding of the normalized preprocessed observation data, numeric simulation data, and domain interpretable data layers. A seventh step 270 includes training a spatial-temporal emulator model for a physical numerical model using the normalized preprocessed observation data, the numeric simulation data, and the domain interpretable data. An eighth step 280 includes incorporating prior knowledge of the physical system into the spatial-temporal emulator model.

A ninth step 290 includes estimating one or more physical parameters of the physical system based on the spatial-temporal emulator model. A tenth step 295 includes utilizing the estimated one or more physical parameters for at least one of a plurality of applications.

For at least some embodiments, the sensor data includes physical parameters of atmospheric and/or surface and/or subsurface flows, for example one or more of the following: wind speed, temperature, pressure, atmospheric particulate matter, precipitation, soil moisture, and others. For at least some embodiments, physical sensors sense the wind speed, the temperature, the pressure, the atmospheric particulate matter, the precipitation, the soil moisture, and others.

For at least some embodiments, the generated physical parameters include, or more of wind speed, temperature, pressure, atmospheric particulate matter, precipitation, soil moisture, hail, wildfire flame front, snow water content, snow cover, vegetation cover, vegetation type, and others.

Figure 3:
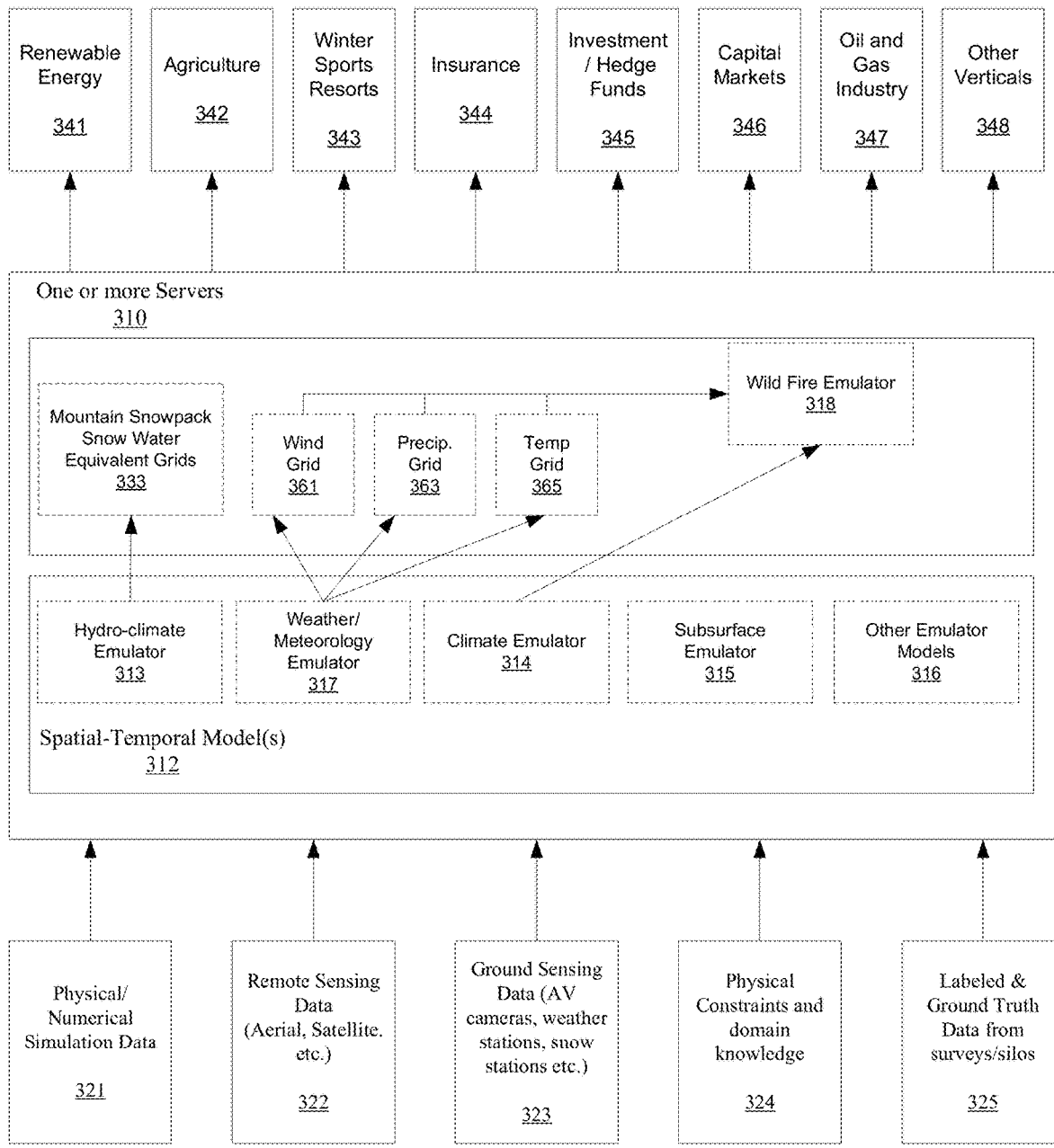
FIG. 3 is a more detailed block diagram of a system for generating simulations of physical variables of a physical system and a subset of use cases, according to an embodiment.

For at least some embodiments, the generated physical parameters are used across specific use cases, including those listed in FIG. 3: Renewable Energy generation 341, Agriculture 342, Winter Sports/Resorts 343, Insurance and Reinsurance 344, Investments and Hedge Funds 345, Capital Markets 346, Oil & Gas 347, as well as Other Verticals 348.

As previously stated, the observational data and the numeric simulation data are preprocessed. For an embodiment, the preprocessing of the data includes a process by which input data is modified or transformed to remove clear inconsistencies.

As previously stated, the preprocessed observational data and the numeric simulation data are processed to extract interpretable structures and patterns within that data using ground truth and labeled information to create domain interpretable data. For an embodiment, the ground truth includes generally-acceptable standard for the value of certain simulated or observed variables, typically acquired via custom-made sensors or human annotation.

As previously stated, the preprocessed observation data, the numeric simulation data, and the domain interpretable data layers are normalized. For at least some embodiments, the normalization of the data includes a process by which one or multiple input data sources (either observational or simulation, or both) are brought to a common, standardized format that can be easily ingested and acted upon by a further computational workflow downstream. This may include, but is not limited to, specific steps to bring one or multiple input data sources to the same spatial or temporal resolution, or learn distributed or hierarchical representations of the preprocessed observation or simulation data such as vector or tensor embeddings in a common high-dimensional space.

For at least some embodiments, the numeric simulation data additionally includes reanalysis data obtained from previous data assimilation work, collected from public scientific databases. For an embodiment, the reanalysis data includes data sets obtained by assimilating simulation data with observational data according to certain statistical and numerical methods.

For at least some embodiments, the observation data and the numeric simulation data include gridded 2D, 3D, or higher-dimensional data over time. For at least some embodiments, the data is gridded (2, 3 or more dimensions) over time. For at least some embodiment, the data includes dense spatial information that include either regular grids (e.g., 2D images), or irregular grids (e.g., adaptive mesh resolution simulations). For at least some embodiments, the observation data and numeric simulation data include time series data. That is, data points are collected over time at specific locations which may be spatially sparse.

For at least some embodiments, the ground truth and labeled information data includes $3^{rd}$ party data silos, including, but not limited to, ground truth annotations, labeled data, and survey data. This may include, for example, polygon contours or pixel-label masks indicating certain atmospheric structures like atmospheric rivers, tropical cyclones, or hurricanes; land structures such as vegetation type or health, snow cover masks; or data on infrastructure such as surveys, asset characteristics, land use characteristics etc.

For at least some embodiments, incorporating prior knowledge of the physical system into the emulator model includes utilizing statistical or domain-inspired constraints in the training process of the emulator model ("soft" constraints). For an embodiment, this is implemented by incorporating terms into the model optimization loss (fitness) function penalizing the departure of model output from physical properties expected for the system studied.

For at least some embodiments, incorporating prior knowledge of the physical system into the emulator model includes explicitly engineering at least one component of the emulator model architecture (e.g., convolutional filters, latent space) to impose structure ("hard constraints") that leads to physically-feasible model output. For example, in the case when the model is a convolutional neural network, such a constraint may be that certain convolutional filters be fixed to restrict the class of operators they learn to represent numerical differentiation.

For at least some embodiments, estimating one or more physical parameters of the physical system includes atmospheric flow, surface flow, hydrology, climate, or weather variables including at least one of temperature, wind, precipitation, flow speed, or soil moisture.

For at least some embodiments, training the emulator model includes 1) retrieving an untrained model, 2) predicting physical model output comprising applying a current model to the normalized preprocessed observation data, the numeric simulation data, and the domain interpretable data, 3) testing and adapting the current model by updating model parameters, and 4) iterating on this process until a measure of convergence is achieved.

For at least some embodiments, testing the current model comprises 1) measuring a fit of the predicted physical model output and 2) computing an error function by comparing the measured fit with physical knowledge.

For at least some embodiments, retrieving a model (such a spatial-temporal model 114 of FIG. 1) includes at least one of the following processes, as for example: 1) designing the model architecture to reflect domain knowledge and current best practices, then initializing the architecture with an initial value of the parameters, following best practices and state-of-the art procedures; 2) obtaining an existing model architecture with already-trained parameters, and modifying only part of the architecture, e.g., initializing trainable parameters to be only a subset of all model parameters.

At least some embodiments further include building a plurality of emulator models for different use cases including at least one of hydroclimate models, climate models, numerical weather prediction models, meso-scale weather models, surface flow models, subsurface flow models, environmental fluid dynamics models. At least some embodiments further include retrieving an initial model for each of the different use cases and building a corresponding trained model of one or more of the use cases.

At least some embodiments include building emulator models for one or multiple use cases by connecting special-purpose components (also referred to here as modules or operators), each special-purpose component performing specific tasks, including, but not limited to, 1) super-resolution in space (implementing the functionality of increasing the resolution of gridded data over space), 2) super-resolution in time (implementing the functionality of increasing the resolution of gridded data over time), 3) domain knowledge incorporation (implementing the functionality of incorporating domain knowledge or physical constraints or laws), and 4) spatial-temporal modeling (implementing the functionality of spatial-temporal emulation). At least some embodiments include connecting all or a subset of the special-purpose components into custom computational pipelines specific to the needs and requirements of one or more applications. At least some embodiments include generating new emulator models by connecting either individual modules or other emulator models in patterns required by the specifications of different applications at hand.

At least some embodiments include generating one or more of the emulator models or modules/operators, and connecting them (in that, the output of one or more models become the input of other models) in ways specified by the application of interest, generating new, derived emulator models. For at least some embodiments, connecting emulators includes 1) formatting the output or one or more emulators in the form of tensors; 2) concatenating these output tensors in specific ways required by the input requirements of the other emulators that will ingest this output; 3) set up another set of emulators to ingest this concatenated output tensor data as inputs. For example, as indicated in FIG. 3, a wildfire emulator model may be comprised of a wind emulator module, of a temperature emulator module, and of a hydroclimate emulator module as sub-components. The output of such emulator modules will be in the form of tensors (gridded data), either 1D, 2D, or in more dimensions, ingestible as input by other emulator modules.

At least some embodiments include generating one or more emulator models that are compressed versions of initial emulator models, yet retaining the performance of the initial models. For at least in some embodiments, this is achieved through eliminating the model parameters or aspects of model architecture that have minimal impact of model performance At least some embodiments include compressing one or more emulators by 1) reducing emulator size (as measured by number of parameters or memory footprint) or 2) reducing the complexity of data transformations performed by the emulator, with minimal impact on emulator operational performance For example, for at least some embodiments where the emulator module is implemented as a neural network architecture, this includes 1) reducing the number of layers, 2) reducing the number of neurons, or 3) reducing the number of parameters specifying the computational behavior of each neuron, and 4) removing connections between existing layers or neurons in the model by systematically pruning sub-networks (also called pathways) through the neural networks that do not contribute substantially to model output, as measured by the change in performance when those pathways are removed.

At least some embodiments include pruning pathways through neural networks. For at least some embodiments, pruning the pathways through neural networks includes 1) retrieving a trained emulator model, whereby the model architecture is based on a neural network, 2) selecting sub-networks as candidates for removal (either at random, or by employing best-practices in the literature), 3) removing the candidate sub-networks from the emulator model and re-training the model, 4) computing model performance on a validation dataset and standard, predefined task, and 5) iterating until a model is achieved that has a size below a certain pre-defined level, as well as maintaining the same level of performance on the validation dataset as the original emulator model.

For at least some embodiments, the spatial-temporal emulators include machine learning-based models and computational workflows that approximate (e.g., in a statistical or dynamical sense) the behavior of numerical, process-based models. Here, machine learning (ML) and artificial intelligence (AI) are referred to interchangeably.

FIG. 3 is a more detailed block diagram of a system for generating simulations of physical variables of a physical system, according to an embodiment. At least some of the described embodiments include an artificial intelligence (AI) platform for data fusion and AI-based physical system emulation. The described embodiments allow for quickly developing modular, ultra-fast, scalable deep learning physical emulator models that run on a wide variety of machine learning hardware and natively use contemporary open-source machine learning software frameworks. The described embodiments integrate physical simulation data (including, but not limited to, data on climate and weather systems and built infrastructures) with empirical observation data from remote-sensing (RS), local ground sensor (e.g., weather station), and label (ground truth) data from surveys and data silos.

FIG. 3 illustrates the concepts of at least some embodiments of an AI platform for physics-enabled AI emulation of physical systems, focusing on components of the computational flow and application layer. As shown, inputs to spatial-temporal model(s) 312 includes numerical simulation data 321 (output from numerical simulation models). For an embodiment, this data is formatted as dense grids (either regular or irregular) over time.

Further, as shown, inputs to the spatial-temporal model(s) 312 includes observational remote-sensing data 322 (acquired, for example, by physical sensors on satellites). For an embodiment, this data is formatted as dense regular grids over time.

Further, inputs to the spatial-temporal model(s) 312 may include reanalysis data (combining numerical model output with observational data, obtained from publicly-available databases or from non-public databases). This data typically is formatted as dense regular grids over time.

Further, as shown, inputs to the spatial-temporal model(s) 312 includes observational ground-sensing data 323 (from IoT sensors such as weather stations or cameras), available from public databases or through non-public sources. These data are typically geographically-sparse, and formatted as time-series.

Further, as shown, inputs to the spatial-temporal model(s) 312 includes domain knowledge and physical constraints 324. This information may be embedded at different points in the computational pipeline, for example in the machine learning model architecture itself (e.g., in the design of the neural network layers or connection patterns between layers, i.e., hard constraints), or in the training procedure of the machine learning model (e.g., via the inclusion of domain-inspired penalty terms in the loss function of the optimization).

Further, as shown, inputs to the spatial-temporal model(s) 312 includes labels, metadata, and ground-truth data 325 (available from public surveys and data siloes/databases, or obtained via custom labeling). This data is typically in the form of metadata and relational data, e.g., polygons or pixel-level class labels for semantic segmentation of images).

For at least some embodiments, the spatial-temporal model(s) 312 implements a unified, modular machine-learning computational workflow for building physics-informed machine learning emulators (surrogate models) of physical systems. The platform allows for both building the emulators (the training phase) and for running the emulators (an inference phase).

For at least some embodiments, the spatial-temporal model(s) 312 provides for building of emulators using the same underlying modular computational workflow. Supported areas include, but are not limited to, environmental computational fluid dynamics-based applications such as hydroclimate models (emulator 313), climate models (emulator 314), numerical weather prediction models (317), geophysical subsurface flow models (emulator 315), or other physical and process-based simulator models 316. The emulator modules are themselves built by composing basic AI modules fulfilling certain specialized functions, also called operators.

The outputs of one or more emulators can be used either standalone, e.g., the hydroclimate emulator model outputs mountain snowpack snow water equivalent grids 333. In addition, the outputs of some emulator models can be used as inputs to other emulator models, e.g., the Weather/Meteorology emulator model 317 outputs, for example, Wind Grids 361, Precipitation Grids 363, and Temperature Grids 365, which can be used, in addition to the outputs of other emulator models such as the climate emulator model 314, as inputs to building a Wildfire Emulator Model 318.

At least some embodiments include building complex emulator models by composing emulators in a modular, "plug-and-play" fashion. As each module is built following the same computational workflow, composing one or several emulators yields a new emulator, itself composable with other emulators or basic modules. For an embodiment, the system further operates to generate complex emulator models comprising connecting a plurality of the emulator models, wherein the emulator models are built by connection sub-modules that perform specific functions including increasing spatial resolution and temporal resolution of gridded data. That is, for an embodiment, the emulator models are built by connecting sub-modules performing specific functions, including, for example, for increasing the spatial resolution of gridded data, for increasing the temporal resolution of gridded data, for spatial-temporal modeling.

At least some embodiments include implementation of a flexible Application Programming Interfaces (APIs) and User Interfaces (UIs) layer designed for exposing platform capability for use-cases of interest, including, but not limited to, sectors such as renewable energy, agriculture, insurance, reinsurance, real estate, winter sports resorts, investment and hedge funds, capital markets, or oil & gas.

Figure 4:
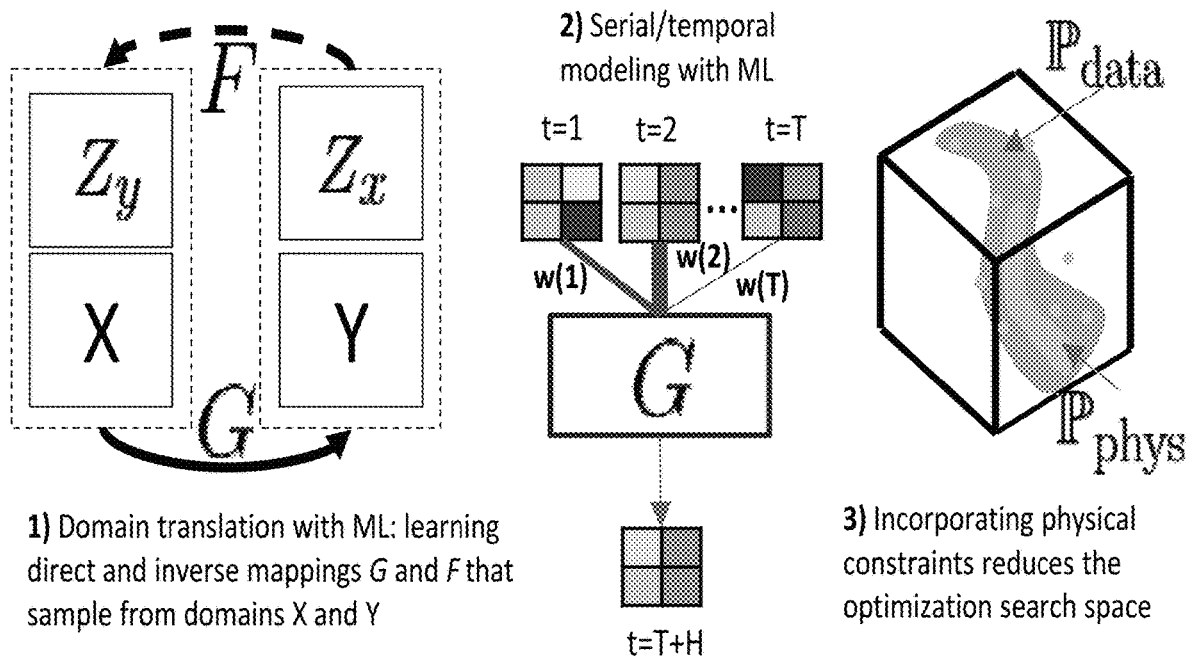
FIG. 4 shows underlying functionality of components of a spatial-temporal model, according to an embodiment.

FIG. 4 shows components of a spatial-temporal model, according to an embodiment. At least some embodiments utilize generative machine learning models such as Generative Adversarial Networks (GANs), Variational Autoencoders (VAEs), or Neural Ordinary Differential Equations (NeuralODEs). For at least some embodiments, training a spatial-temporal emulator model for a physical numerical model using the normalized preprocessed observation data, the numeric simulation data, and the domain interpretable data can be implemented using the machine learning framework illustrated in FIG. 4.

Specifically, at least some embodiments utilize GANs for domain/modality translation that allow implicit sampling in forward and inverse domains. For example, in a hydroclimate and snow water equivalent estimation emulator, one domain is that of the input variables (e.g., meteorological, topographic, and other inputs), while the other is that of the output variable of interest, snow water equivalent.

As shown in FIG. 4, at least some embodiments implement model emulation as learning mapping functions between two or more domains. Depicted in FIG. 4 are two domains X (e.g., input meteorological variables in some embodiments) and Y (e.g., hydroclimate model output, snowpack water in some embodiments). The process for learning the mapping functions consists of the following steps: 1) training a model that learns a forward mapping function G making the translation between domains X and Y, in the 2-domain example; 2) training a model to learn an inverse mapping F between domains Y and X, whereby both forward and inverse maps G and F between X and Y are learned in one training loop.

At least in some embodiments, this framework explicitly structures the latent spaces of G and F to allow control over the source of randomness Z, as shown schematically in FIG. 4. This allows drawing diverse samples from the underlying data manifolds in X/Y. These ensembles of scenarios can then be used in a Monte Carlo setting to compute empirical CDFs and other risk measures of variables of interest.

At least in some embodiments, this framework may be used for performing AI-based data assimilation, including building emulator modules (or operators) for modality translation between simulation variables of interest (typically not observable directly, e.g., surface precipitation) and (proxy) observational data (e.g., top of the atmosphere water column remote sensing radar). These modality translation modules have the same computational workflow (inputs and outputs are tensors, i.e., gridded data) and can be connected into larger pipelines.

As previously stated, for at least some embodiments, GANs or other generative learning models such as VAEs or NeuralODEs are utilized for spatial-temporal modeling. At least some embodiments of the system leverage machine learning approaches to model the temporal evolution of dynamical systems. At least some embodiments leverage architectures that model temporal dynamics of physical processes to generate predictions and scenarios of the future evolution of the processes modeled. At least some embodiments leverage machine learning architectures for modeling temporal correlations, including Recurrent Neural Networks (RNNs), including variants such as Long Short-Term Memory Networks (LSTMS). At least some embodiments leverage attention models such as Transformers to model long-range serial correlations. At least some embodiments leverage convolutional neural networks (CNNs) to model spatial correlations. As the embodiment in FIG. 4 shows, Transformers model temporal correlations by learning how to weigh the most relevant parts of the past while generating predictions of the future evolution of the process modeled, thereby capturing the different temporal correlation scales of systems of interest.

As previously stated, at least some of the spatial-temporal models incorporate domain knowledge, either as hard or soft constraints, as discussed above. This previous research on Physics-Informed GANs (PI-GANs) for fluid dynamics, land use, or hydroclimate model emulation both show the effectiveness of incorporating physics or domain-inspired constraints into machine learning architectures (e.g., cannot have snow on water areas, higher water content for higher elevations, etc.). This research has shown that incorporating such knowledge achieves certain benefits, including reducing the optimization search space, leading to faster convergence to better, physically-feasible solutions (FIG. 4-3). At least some of the spatial-temporal models that utilize generative machine learning model designs such as GANs, VAEs, or NeuralODEs, incorporate a) soft constraints (via penalty terms in the loss function), and b) hard constraints, via explicit structuring of the ML model latent space and convolution neural network (CNN) filters (seen as specialized differential operators).

At least some embodiments leverage deep learning-based super-resolution methods for numerical simulation and remote-sensing data to implement emulator modules for increasing the spatial or temporal resolution of tensors (gridded data). At least some embodiments include creating high resolution climate data grids by downscaling baseline climate layers using CNN-based image super-resolution algorithms. The relevant observational data products (satellite and ground station) on key parameters relevant to applications of interest, for example hydroclimate modeling (i.e., precipitation, radiation, temperature, surface radiation, and wind). At least some embodiments implement super-resolution methods based on generative learning techniques such as GANs, VAEs, or NeuralODEs, In addition, at least some of the described embodiments implement custom methods and pipelines for quantifying and propagating uncertainty in gridded simulation and remote-sensing imagery data over time, including Bayesian learning techniques for deep neural networks to model error propagation.

At least some of the described embodiments implement techniques to enhance training stability, convergence, and scaling of deep generative learning models. Specifically, in at least some embodiments, this is implemented by 1) designing custom architecture components (e.g., custom layers if the emulator module is a neural network), 2) designing the optimization loss functions to include regularizing loss terms, or 3) designing neural network layers and connections between them that express neural networks as systems of coupled ODEs/PDEs, allowing to use mature results from linear dynamical systems analysis to enhance training stability.

At least some embodiments include mechanisms to allow fine-grained controllability of the conditional generative architectures and explicit structuring of the latent space to relate it to interpretable physical simulation parameters. These mechanisms are implanted by 1) incorporating features and latent noise at different stages in the network architecture, 2) imposing assumptions about the distributions followed by the latent space random vectors, 3) incorporating boundary and initial conditions such as complex geometries/terrain elevation and remote-sensing observations to enable fast, realistic interpolation in simulation parameter configuration space.

At least some embodiments include architectural designs for implementing scenario analysis and hypothesis generation. This capability is implemented by 1) conditioning forecasts and scenario simulations on real-time observational data (i.e., remote- and ground IoT sensing), 2) implementing architectures for real-time updates of error propagation, 3) implicitly sampling the potentially unknown distributions of the variables in the physical system modeled, and 4) using the scenario generation capability for Monte-Carlo simulations and estimating underlying errors, empirical distribution curves, hazard curves, financial loss curves, exceedance probability curves, at least in some embodiments.

At least some embodiments leverage the end-to-end differentiability of deep learning architectures, and gradient computations via backpropagation for emulator model or module estimation to allow estimating both gradients and standard errors of emulator parameters. This allows computing the sensitivity of outputs (e.g., in the case of snow water equivalent upstream of a hydropower plant) with respect to certain inputs of interest (e.g., temperature or wind speed measured at the location of a ground station) for what-if analyses.

At least some embodiments include a modular emulator design using a unified computational workflow based on gridded (tensor) data being both input as well as output of emulator modules or operators. At least some of the described embodiments leverage a machine-learning centric computational workflow, i.e., the patterns in transformations of input and output data to different components of the processing pipeline. At least some of the described embodiments implement several standard data interchange formats, including tensors (1D vectors and 2D grids, or higher-dimensional) over time, including both raw data as well as embeddings learned from the data via representation learning models (e.g., autoencoders). Inputs and outputs to the modules illustrated in FIG. 5 include tensors, which allows for an efficient data flow and for interchangeable connection patterns between modules.

At least some embodiments include compressing the machine learning emulators while incorporating constraints imposed by the computing devices the emulators are run. For example, this may include edge computing devices, which may pose memory, data bandwidth, or power consumption constraints. For certain applications of interest, the AI emulator models need to run efficiently on local devices to generate accurate hypotheses on system evolution in real-time and in situations with limited availability of wireless/cloud connectivity (e.g., cell towers fail during a wildfire). For this, at least some of the described embodiments leverage state-of-the-art machine learning research to compress the machine learning model to fit on the available edge hardware in terms of memory and CPU/GPU resources, under constraints on the target device energy use and user latency, while retaining high fidelity to the uncompressed model, using distillation and ML model compression techniques that have shown 100x model size reduction on edge devices.

It is beneficial to deploy and run emulator models on edge devices to allow certain applications that require in-the-field operability and real-time computation under severe data bandwidth, power usage, and other constraints, such as fire spread prediction for fire first-responders, during and after-the-event claims adjusting for insurance companies, or low-latency computations for high-frequency trading.

An embodiment includes compressing an emulator model for use on edge and IoT devices. For an embodiment, this includes compressing the trained spatial-temporal emulator model, including 1) generating candidate mutations of an architecture of the trained spatial-temporal emulator model to reduce a number of parameters or connections of the parameters; 2) evaluating a performance of each of the candidate mutations of the architecture on validation data using metrics; 3) retaining a subset of candidate mutations exhibiting best performance on the metrics; 4) iterating steps 1-3 until convergence to a desired reduction in size of the trained spatial-temporal emulator model, yielding a compressed trained spatial-temporal model (that is, the steps of generating candidate mutations, evaluating the performance of the mutations, and retaining a subset of the candidate mutations is repeated over and over until a number of parameters or connections of parameters has been reduced which reduces the size of the trained spatial-temporal emulator model to a desired size); 5) deploying the compressed trained spatial-temporal emulator model to one or more edge devices. The reduced size makes the compressed trained spatial-temporal emulator model operable on edge devices, such as, a mobile device, such as, a mobile smart phone.

For at least some embodiments, compressing the machine learning emulators so that the machine learning emulators (such as, spatial-temporal emulator models) are operable on processing-limited edge devices includes A) generating mutations of the initial network architecture by 1) replacing some of the large (e.g., 3×3) convolutional filters with smaller filters (e.g., 1×1); 2) decreasing the number of input channels to the large filters; and 3) moving some down-sampling operations to later stages in the network, and 4) computing model accuracy on a holdout sample; B) iterating in an evolutionary fashion, keeping the most promising network mutations from among the population generated, and feeding them to step A.

Figure 5:
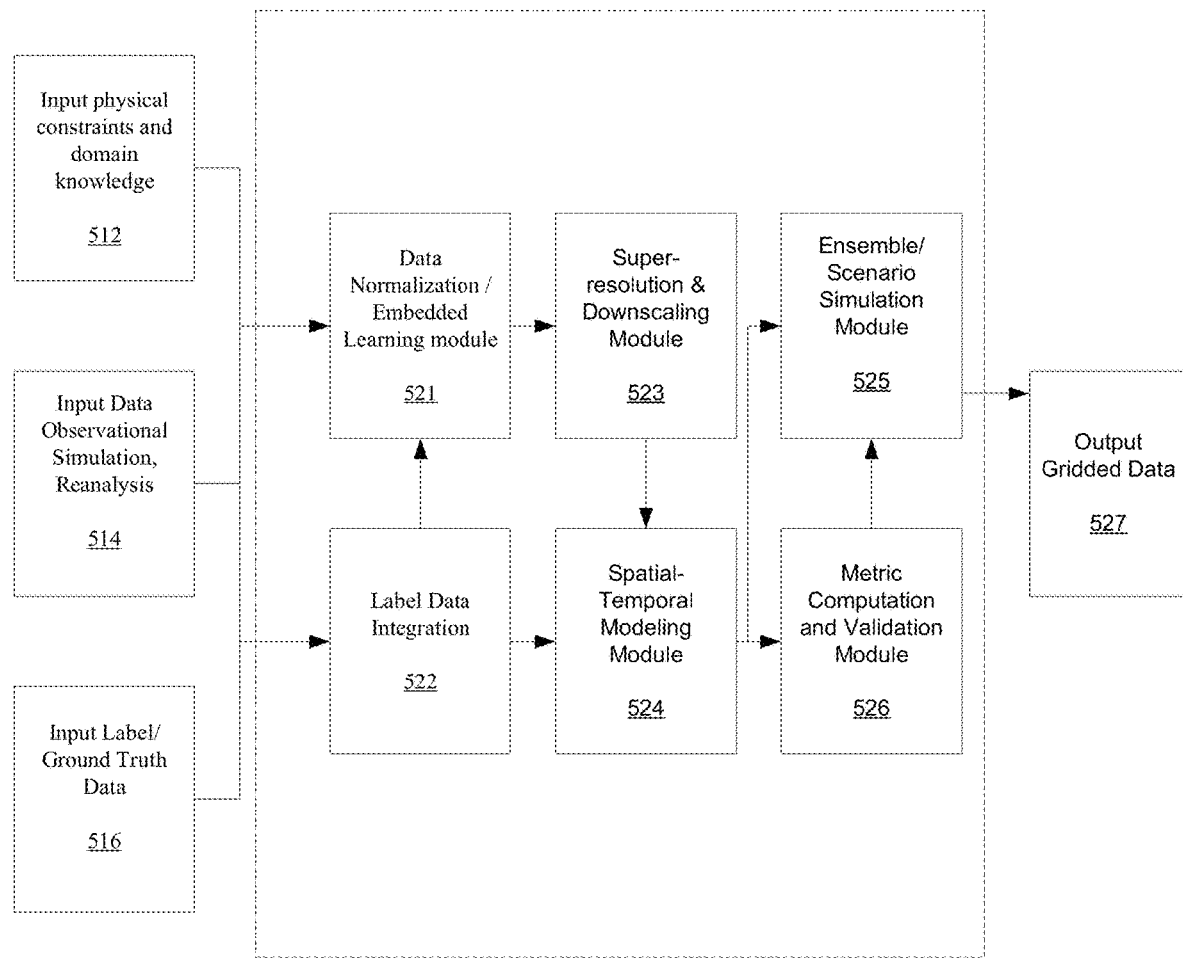
FIG. 5 shows a modular design of a physics-enabled emulator, according to an embodiment.

FIG. 5 shows the modular design of a physics-enabled emulator such as shown in FIG. 1 as spatial-temporal model 114 according to an embodiment. As previously described, the spatial-temporal model 114 can be retrieved for a variety of applications, such as a wildfire spread forecasting application, a snow water equivalent estimation application, etc. The embodiment of FIG. 5 provides an example of an architecture of a physics-informed AI emulator (such as the spatial-temporal model 114). It illustrates one possible configuration among many, suited for spatial-temporal modeling of computational environmental fluid dynamics-based numeric models (e.g., climate, hydroclimate, meteorology, weather etc.). The inputs include Input physical constraints and domain knowledge 512, including both quantitative relationships and physical laws, and qualitative relationships (e.g., the change in one quantity leads to a change in another), Input observational data, reanalysis data 514, and numerical simulation data, typically grids over time, and Input label data 516 (e.g., class labels for image pixels, annotations, surveys etc.).

The output 527 includes a sequence of gridded data over time, whereby each cell of the grid contains a measure of risk (probability distribution) of the output parameter(s).

For at least some embodiments, a data normalization and embedding (representation) learning module 521 operates for receiving sensor data, and extracting representations of numerical simulation data, observational data, or reanalysis data. For at least some embodiments, extracting representations from input data includes 1) retrieving a previously-trained or untrained model; 2) ingesting the data through the model; 3) setting up the model to perform specific tasks, for example unsupervised data reconstruction, supervised or semi-supervised segmentation or classification.

A label data integration module 522, which may be embodied as, for example, via modules for 1) gridded data segmentation, 2) gridded data classification, and 3) object/structure detection in gridded data. This module implements functionality for processing imagery/gridded data over time and extract domain-specific, interpretable structure and information. These functions may also include representational learning for data other than gridded (tensor) formats, including, for example, embedding/representation learning for tabular/relational data that normalize this data to vectorial embedding representation for easy integration into deep learning pipeline.

A downscaling (super-resolution) modules 523 operate to grid data over time. This may be a spatial downscaling module, or a temporal downscaling module, or a spatial-temporal downscaling module.

A spatial-temporal modeling emulation module 524 operates to model spatial and temporal correlations.

An ensemble and scenario generation and simulation module 525 operates to create summaries of the distributions over space and time of the output variables of interest (e.g., wildfire spread, snow water equivalent, wind fields) that are useful for informing one or more applications. It operates by 1) accessing the output of the spatial-temporal modeling module 524 to generate a multitude Monte Carlo scenarios and ensembles with different initialization configurations for the simulated process; 2) computing statistics (such as histograms, probability distribution functions, cumulative distribution functions, etc.) for each point in space and time in the domain considered, based on aggregating the ensembles and scenarios generated; and 3) validating these statistics against key metrics implemented in the Metric Computation and Validation Module 526.

A validation module 526 implements computation of spatial and temporal performance metrics as appropriate for the application at hand. For an embodiment, the computation of spatial and temporal performance metrics includes: 1) two-point correlation spectra, 2) temporal coherence, 3) autocorrelation functions, or 4) histograms of values.

At least some embodiments of scenario generation use the sampling capabilities of the spatial-temporal modeling module 524 to generate scenarios and hypotheses, representing ensembles of models. For at least some embodiments, these ensembles of models are then used to derive measures of risk of the spatial and temporal evolution of the physical parameters modeled, i.e., statistics (such as cumulative distribution functions) derived empirically.

At least some embodiments include other AI modules performing specific functions, with a similar input/output data flow as the modules described above, connected to each other in specific ways.

At least some embodiments include AI emulators that are interoperable and constructible through specific application programming interfaces (APIs). These APIs are accessible either as libraries or modules in programming languages (e.g., Python, C/C++, or *Julia*), or via a web interface (e.g., REST). The API layer allows relevant functionality to be exposed to software developers that would design wrappers, graphical user interfaces, and access patterns for different business use cases and products. New functionality is achieved by programmatically connecting one or more of the emulator modules or operators in ways specific to the application of interest. For example, one application may require spatial-temporal emulation, spatial downscaling, and scenario generation functionality, whereas another application may instead require temporal downscaling and scenario generation functionality.

For at least some embodiments, the example emulator, the emulator operators (or modules) as described, and other emulators built using the described embodiments are part of a library of AI emulator modules that constitute a "plug-and-play" ecosystem of modules that are accessible through the APIs.

At least some embodiments include building new emulators according to the following process: 1) the user constructs specific API calls instantiating a selection of existing modules from the library; 2) connectivity patterns between instantiated modules are specified according to the task at hand (e.g., wind emulation, precipitation emulation and downscaling, etc.), whereby the output of some modules serves as input to other modules; 3) the new emulator module is verified and registered as valid module, and committed to the library, thereby becoming available for further re-use. As such, the described embodiments enable the creation of specific "apps" that require limited knowledge of underlying physical systems that are emulated or of the underlying machine learning and high-performance computing technologies.

Figure 6:
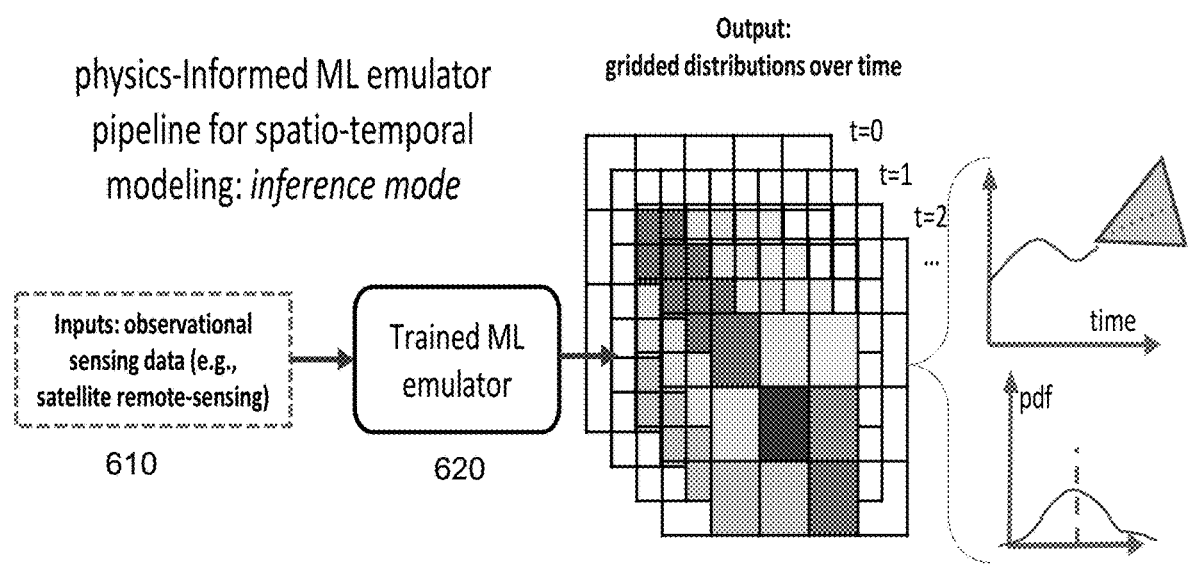
FIG. 6 shows an inference mode of an emulator pipeline for spatial-temporal modeling, according to an embodiment.

FIG. 6 shows an inference mode of an emulator pipeline for spatial-temporal modeling, according to an embodiment. At least some embodiments include inference with physics-informed AI emulators 620 (such as, the previously described spatial-temporal emulator model, i.e., a trained version of the untrained spatial-temporal model 114). As FIG. 6 illustrates, at inference time (when the AI emulator 620 is used to generate predictions and scenarios), the only data the emulator model uses as input is observational data 610, if available. In inference mode, the AI emulator does not require any simulation data or being otherwise connected to a numerical simulation infrastructure or codebase.

Further, as shown in FIG. 6, an output includes a gridded distribution data over time, whereas in each cell of the grid a measure of the probability distribution of the output variable(s) is computed.

Figure 7:
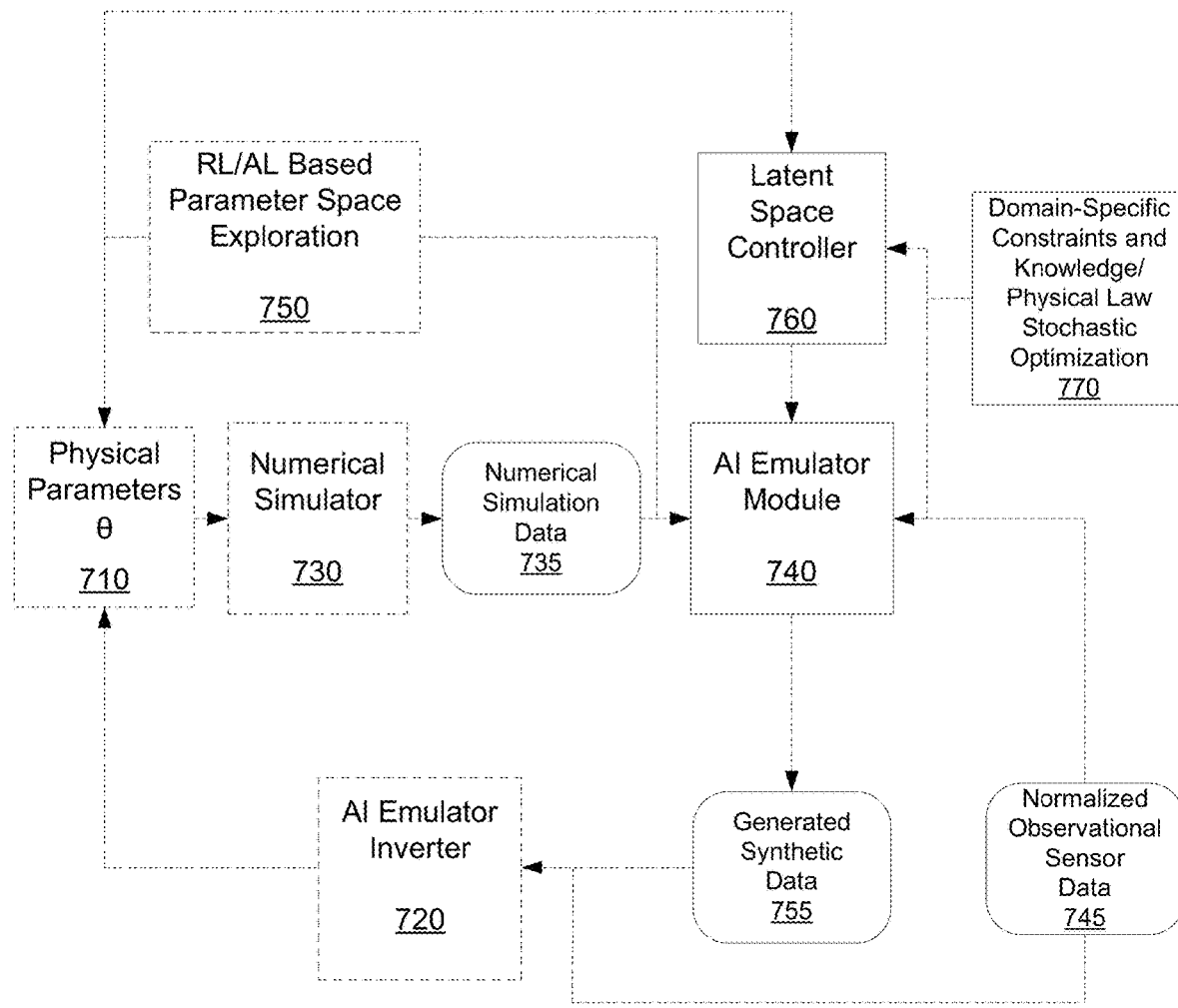
FIG. 7 shows a system for training a spatial-temporal model, according to an embodiment.

FIG. 7 shows training of a spatial-temporal model, according to an embodiment. At least some embodiments include training physics-informed AI emulators. FIG. 7 shows the data products, either sources or generated (dashed line, round corner boxes) and the computational modules (solid line, square boxes).

Observational sensor data 745 includes one or more variables in the fields of climate, weather, energy, hydroclimate, hydrology, subsurface flow, or surface flow. This includes processed or derived quantities (e.g., via segmentation and classification) such as obtained from label data integration module 522 in FIG. 5.

A numerical simulator model 730 (optional) includes, but not limited to, computational fluid dynamics (CFD) simulators, global climate simulators, meso-climate simulators such as for wind, temperature, and pressure, hydroclimate simulators such as for precipitation, or snow water equivalent.

Physical parameters 710 (optional) includes variables with well-defined physical meaning and interpretable to human scientists and analysts, which control the output of numerical simulation. These parameters may be either omitted from being included in the training loop, or included either 1) statically, in the sense that their values will not be changed as training progresses, but they are treated as other input data that the AI emulator model is conditional on, or 2) dynamically, in the sense that their value changes during training, via being controlled by the RL/AL Parameter space exploration module 750, based on reinforcement learning (RL) or active learning (AL) techniques. Pre-generating large quantities of numerical simulation data to cover a wide variety of initial conditions for training a spatial-temporal emulator model 114 can be extremely compute-intensive and impractical. The RL/AL module 750 implements control strategies for closed-loop numerical simulation and machine learning training, including 1) generating an initial estimate of appropriate values of physical parameters 710; 2) actuating the numerical simulator 730 to generate a initial quantity of numerical simulation data 735 corresponding to these initial parameters; 3) computing a measure of generalizability of the model (e.g., performance under a validation dataset) for the current configuration of the physical parameters 710; 4) computing updated estimates of the physical parameters 710 that are most likely to improve the measure of generalizability, and 5) iterating until a measure of convergence is achieved, e.g., a validation-set performance as measured by the metrics implemented in Metric Computation and Validation Module 526.

Simulation data 735 is produced by the numerical simulator, either on-line as part of the learning loop, or off-line, retrieved from existing databases, and serving as one of the inputs to the AI emulator.

An AI emulator module 740 includes, in at least some embodiments, a generative machine/deep learning-based architecture that is able to accept tensor-formatted inputs such as, for example, structured regular or irregular grids over time, vector embeddings etc., and outputs structured grids over time, all in the same data structure format of tensors. An example thereof is given in FIG. 5. Note that the emulator module can be composed of one or more of the ML modules described in FIG. 5.

A latent space controller 760 implements control mechanisms for structuring and manipulating the representation (latent) space of the generative model implementing the AI emulator to allow for both controllable random sampling as well as conditional generation based on input data such as physical parameters or observational data.

Synthetic data 755 includes data generated by sampling from the generative machine learning model implementing the AI emulator.

An AI emulator inverter 720 (optional) module learns the inverse mapping from observational data to interpretable physical parameters of the emulated system that could plausibly give rise to the observed data. For at least some embodiments, the AI emulator inverter module is implemented using the domain translation framework described in FIG. 4-1 (referred to by the inverse mapping function F in FIG. 4).

For an embodiment, the Physical parameter exploratory module 750 (optional) implements sampling strategy in physical parameter space based on search techniques from reinforcement learning/active learning. Only to be included when the numerical simulator is included as part of the same learning loop. For at least some embodiments, the module 750 1) constructs approximate joint distributions of the physical model parameters; 2) computes a measure of fit indicating how well the AI emulator is able to sample (or interpolate) in a certain region of the physical model parameter space; 3) propose a number of different samples of physical model parameters that are likely to maximally increase the measure of fit; 4) update the current model parameters to the configuration that corresponds to the optimal value of the fit measure.

Domain-specific constraints 770 including constraints and physical laws applicable to the specific domain being emulated, stemming from physical theory or domain expertise. For example, divergence-free flows for incompressible fluids or rotational invariance are typical constraints incorporated in fluid-dynamics based emulators. The incorporation of additional domain knowledge in the form of constraints and physical laws may reduce the amount of training data or training time necessary to achieve a desired level of performance.

Figure 8:
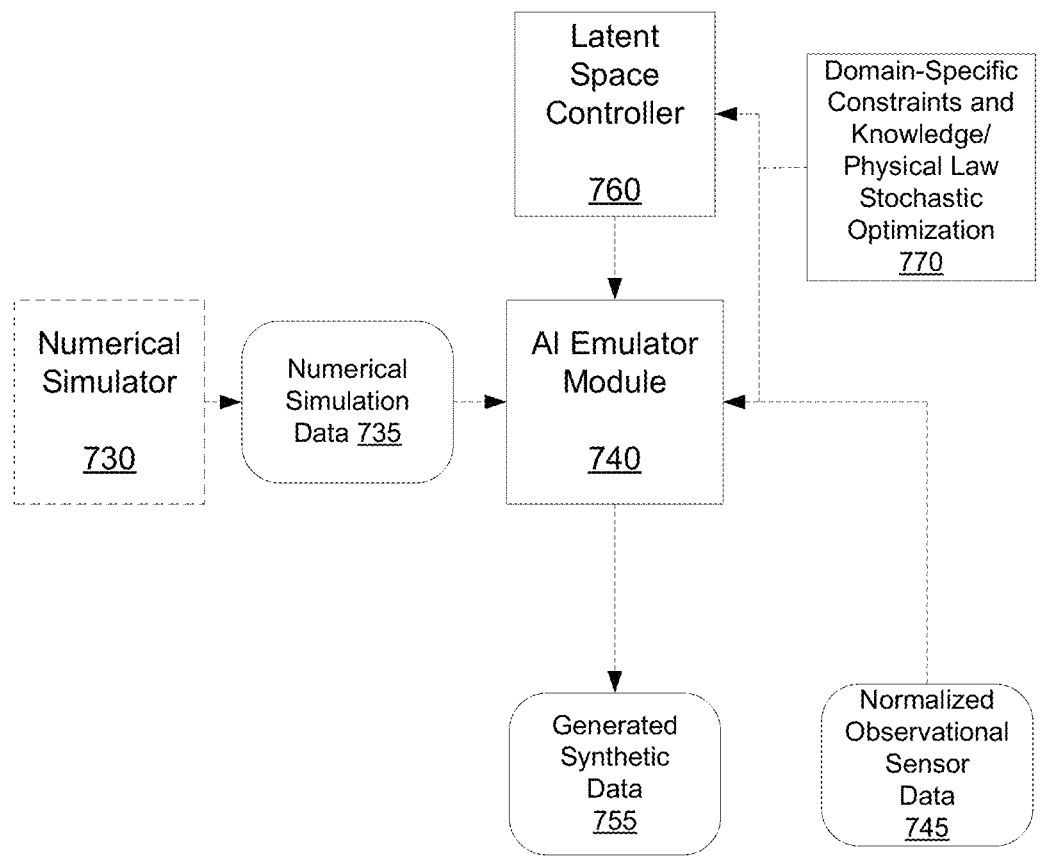
FIG. 8 shows a basic implementation of the emulator model training system described in FIG. 7, according to an embodiment.

FIG. 8 shows a simplified implementation of the emulator model training system described in FIG. 7, according to an embodiment. This baseline training system allows for the creation of physics-informed AI emulators, yet it may require a larger amount of numerical simulation data 735 to be pre-generated across a wide range of values of the physical parameters 710. The system in FIG. 7 overcomes this limitation by implementing a closed-loop numerical simulation and machine learning emulator training with explicit strategies for sampling appropriate values of the physical parameters 710.

Figure 9:
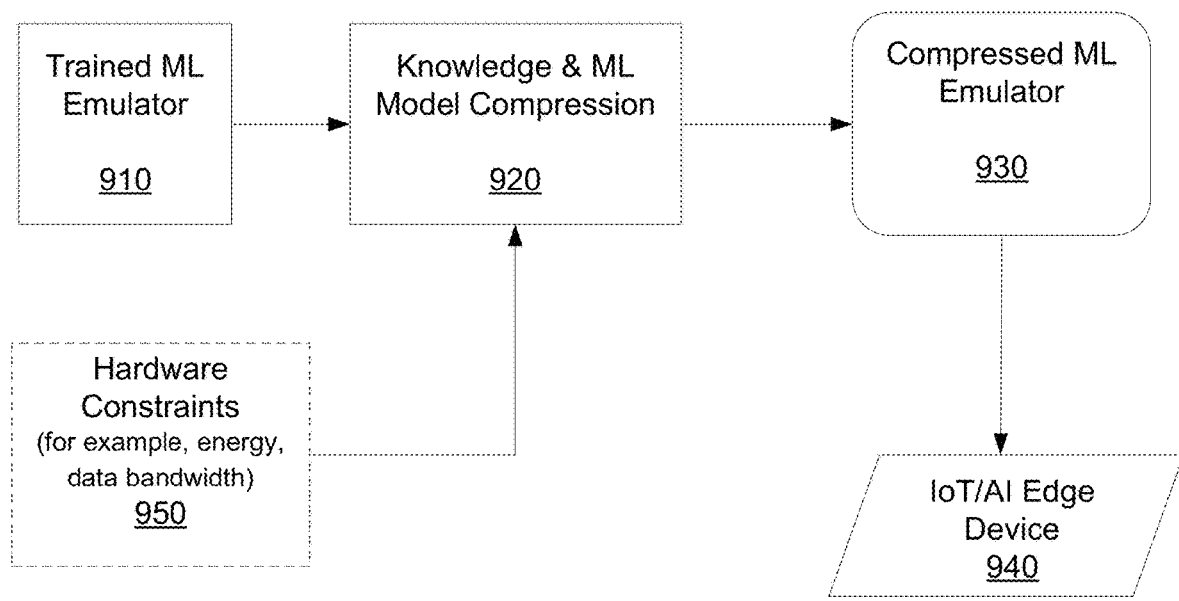
FIG. 9 shows a process for compressing an emulator model for use on edge and IoT devices, according to an embodiment.

FIG. 9 shows a process for compressing an emulator model for use on edge and IoT devices, according to an embodiment. Specifically, FIG. 9 shows the workflow for compressing a trained AI emulator for certain applications that require running such models locally or in a low-bandwidth or low-power environment. The inputs include an ML emulator model 910 trained as previously described, and hardware constraints 950. Compressing the trained AI emulator model 910, for at least some embodiments, includes a Knowledge and ML Model Compression system 920 that performs the process of: A) generating mutations of the initial network architecture by 1) replacing some of the large (e.g., 3x3) convolutional filters with smaller filters (e.g., 1x1); 2) decreasing the number of input channels to the large filters; and 3) moving some down-sampling operations to later stages in the network, and 4) computing model accuracy on a holdout sample; B) incorporating Hardware Constraints 950 either as soft constraints (penalty terms) into the optimization loss function or as hard constraints into the design of the architecture as in Step A); and C) iterating in an evolutionary fashion, keeping the most promising network mutations from among the population generated, and feeding them to step A. The resulting compressed ML Emulator 930 can be deployed and operated on IoT or Edge Devices 940.

FIG. 10 is a flow chart that includes steps of a method for (downscaling) increasing a spatial resolution of) gridded spatio-temporal data on physical variables, according to an embodiment. A first step 1010 includes obtaining weather and climate data, the weather and climate data comprising at least one of gridded numerical simulation data having at least two spatial resolutions (for example, samples per area) including at least a coarse resolution and a fine resolution, or observational data that includes at least one source of sensed physical data. For an embodiment, the spatial resolution determines, for example, a number of samples per an area, such as a physical area. The coarse resolution includes fewer samples per the area than the fine resolution. For an embodiment, the gridded numerical simulation data and/or the observational data include weather and climate-related data.

A second step 1020 includes pre-processing the weather and climate data. As previously described, for an embodiment, preprocessing the observational data and the numeric simulation data removes inconsistencies of the observational data and the numeric simulation data. For an embodiment, the observational data includes irregularly spaced sensor data (for example sensed wind data from towers distributed non-uniformly within a geographic area) in which case the preprocessing resamples the observational data onto a regular grid. For an embodiment, pre-processing the weather and climate data further includes normalizing the pre-processed weather and climate data.

For an embodiment, pre-processing the weather and climate data, and normalizing the pre-processed weather and climate data, includes concatenating physical weather and climate inputs into channels wherein each channel represents one physical variable, and wherein the physical inputs include the weather and climate data. For an embodiment, the channels provide an additional dimension like, for example, stacking. For an embodiment, the inputs (weather and climate data) may be tensors with dimension N×M× C, where N and M are the size of the two-dimensional data and C is the number of channels. Tensors in this form are efficient for input into the network architecture and for the tensor operations that constitute the interpolation filters.

For an embodiment, pre-processing the weather and climate data, and normalizing the pre-processed weather and climate data, includes concatenating physical inputs into channels, wherein each channel represents one physical variable at different times, and wherein the physical inputs include the weather and climate data. For an embodiment, the pre-processed concatenated weather and climate data has the dimensions of NxMx C×S (S is total number of samples), wherein one sample has the dimension N×Mx C, and a batch is NxMx C×B, wherein B<S. Separating the data into batches allows for more efficient training of the network architecture.

A third step 1030 includes training one or more probabilistic downscaling mapping functions of the at least one of the gridded numeric simulation data having at least two spatial resolutions or the observational data comprising applying interpolation filters to successively interpolate the pre-processed weather and climate data to generate output data having a resolution that is equal to the fine resolution.

A fourth step 1040 includes generating high-resolution physical parameters (wind, temperature, humidity, etc.) for at least one of a plurality of applications utilizing the trained probabilistic downscaling mapping functions receiving different weather and climate input data (different data) that has different times and/or locations than the pre-processed weather and climate data used in the training. For an embodiment, the different weather and climate input data differs in location and/or time from the pre-processed weather and climate data, but different weather and climate input data are the same physical variable (wind speed, temperature, humidity, pressure, etc.).

At least some embodiments further include applying channel-specific normalization on each of the channels on a case-by-case basis depending on a specific physical variable. For example, channel-specific normalization may be applied to each channel where the channels include multiple physical variables such as temperature and wind. For an embodiment, the normalization for each variable may be different and specific to that variable.

For at least some embodiments applying the interpolation filters to successively interpolate the pre-processed weather and climate data to generate the output data having a resolution that is equal to the fine resolution includes executing, by a network architecture, a series of tensor operations (the input is the coarse data) representing a set of spatial filters comprising functions that include convolutional filters, and a set of down-sampling and up-sampling steps, nonlinear operations wherein the set of spatial filters include weights that are determined by an optimization process. For an embodiment, the series of tensor operations represents a set of steps or operations that are established at the outset when the network architecture is chosen. For an embodiment, the operations include tunable free parameters (the weights) that are initially unknown but are determined through the optimization process.

For an embodiment, the training of the network architecture includes performing the optimization process including calculating the weights of the set of spatial filters, comprising minimizing one or more loss function components by calculating gradients of the one or more loss function components with respect to the weights and iteratively updating the weights by applying the calculated gradients. For an embodiment, each step of the iteratively updating includes calculating the gradients, adjusting the weights using the calculated gradients and re-calculating the loss function with the new updated weights. This process is repeated until a satisfactory point at which the loss function meets a predetermined criterion.

At least some embodiments further include validating the set of spatial filters after the weights have been calculated by converting low resolution input data not used during training to high resolution output data, and comparing high resolution output data to ground-truth observational or numerical data with respect to various measures error.

For at least some embodiments, the weather and climate data are combined into batches before being input to the network, wherein batches include chunks of the discrete pre-processed weather and climate data. As previously described, for an embodiment, the pre-processed concatenated weather and climate data has the dimensions of N×M×C×S (where S is total number of samples), each sample has the dimensions of N× M×C and a batch has the dimensions of N×M×C×B, where B<S. For an embodiment, the gradients are calculated on a batch-wise basis (evaluating the gradient for each batch independently and updating the weights using the batch-specific gradient), and the weights are updated based on the gradients and iteratively updated.

For at least some embodiments, the nonlinear functions include point-wise nonlinear transformations applied to every element in the series of tensor operations. Exemplary nonlinear transformations include a hyperbolic tangent, ReLu (Rectified Linear Unit), and sigmoid functions and batch-wise normalization which includes shifting/re-scaling by the mean and variance of each batch.

For at least some embodiments, the one or more loss function components includes one or more of a mean error, and adversarial loss, or physics constraints.

For an embodiment, the one or more loss function components include physical constraints might include measures of the power spectral density, conservation of mass, conservation of momentum or conservation of energy. These measures are each differentiable and therefore efficient for calculating the gradient of the loss function with respect to the weights during training of the network architecture. For example, the power spectral density allows for creation of a model that better reproduces detail at the fine scale relative to ground truth data. Because it is a differentiable function, PSD-based loss can be inserted directly into the overall loss function and used to optimize the network architecture through the iterative process of calculating gradients and updating network weights. The use of PSD-based loss allows faster training time and permits larger batch sizes, thus increasing efficiency. The PSD-loss can also directly replace the adversarial loss, thus improving convergence of network training and hence making GANs easier to train. Similar physics-based metrics could also be used in the loss function—conservation of mass/momentum/energy/vorticity (rotation).

At least some embodiments further include initializing the weights before training with a pre-established set of weights, wherein the pre-established weights are determined by a prior training of a same network architecture on a different but related set of weather and climate data, wherein the different but related set of weather and climate data includes the same physical variables at different times, locations, or resolutions. That is, the weights of the spatial filters are initialized at the outset of the training with a pre-established set of weights, wherein the pre-established weights are determined by training the same network architecture on a different but related set of weather and climate data (same physical variables but different times, locations, and/or resolutions).

For at least some embodiments, the observational data additionally includes historical data retrieved or collected from one or more databases.

For at least some embodiments, the numeric simulation data additionally includes reanalysis data obtained from previous data assimilation work. For example, for an embodiment, numeric simulation data additionally includes data collected from public scientific databases.

As previously described, for at least some embodiments, the observation data and/or the numeric data is gridded data. Specifically, for at least some embodiments, the observation data and the numeric simulation data include gridded 2D, 3D, or higher-dimensional data over time. For at least some embodiments, the observation data and numeric simulation data include time series data.

For at least some embodiments, prior knowledge of the physical system is incorporated into the downscaling process. For an embodiment, the prior knowledge is incorporated using statistical or domain-inspired constraints in the training process of the emulator model ("soft" constraints).

For at least some embodiments, the network architecture is established using prior knowledge of physics of the weather and climate data, wherein the network architecture constrains a model to produce a limited range of physically-feasible output. For an embodiment, this includes explicitly engineering at least one component of the emulator model architecture (e.g., convolutional filters, latent space) to impose structure that leads to physically-feasible model output. For example, the network architecture can be chosen to impose rotational or translational invariance, which are typically properties of the physical climate and weather data.

Figure 11:
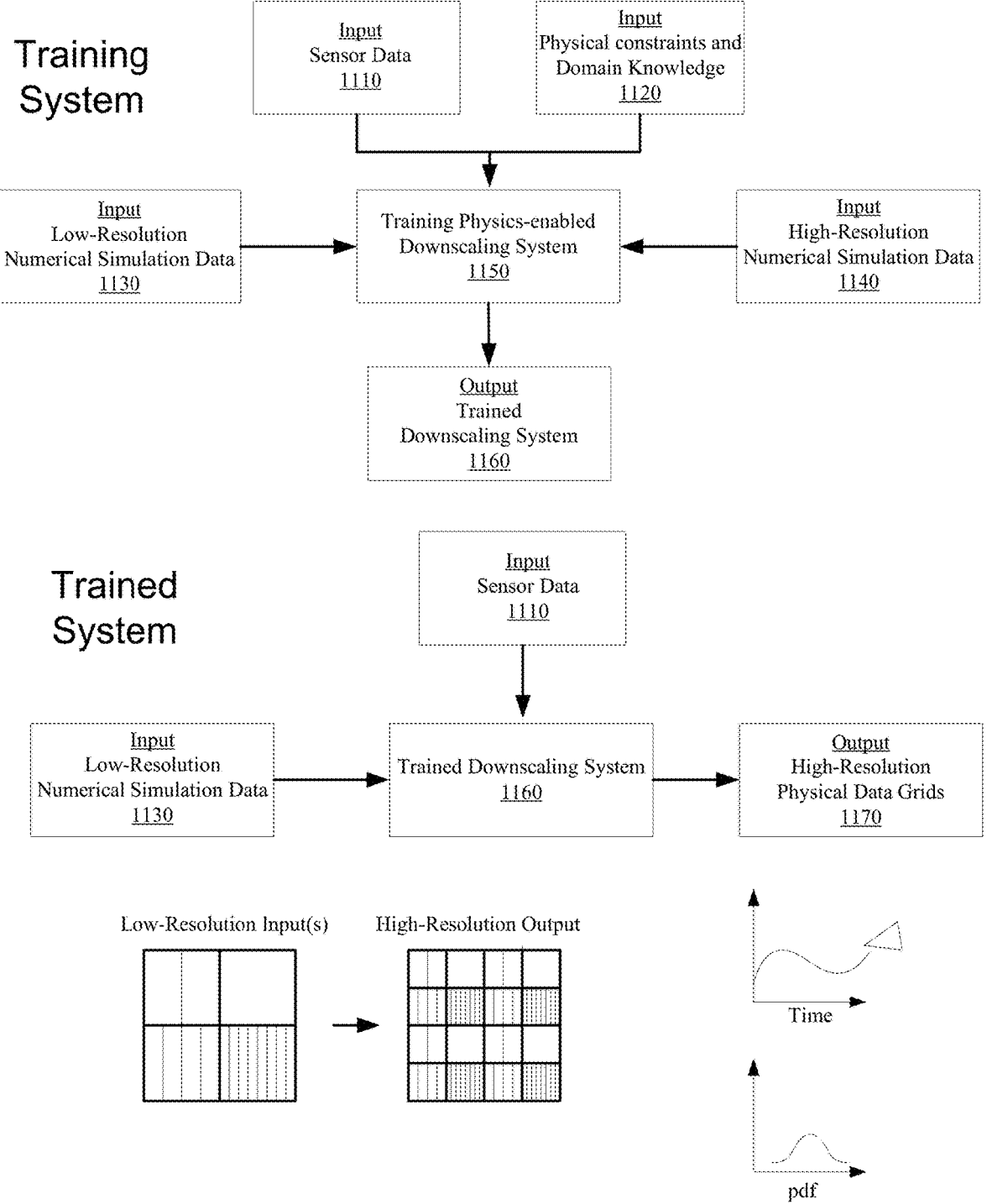
FIG. 11 shows block diagrams of a system for increasing a spatial resolution of gridded spatial-temporal data on weather and climate-related physical variables during a training stage and during a trained stage, according to an embodiment.

FIG. 11 shows block diagrams of a system for increasing a spatial resolution of gridded spatial-temporal data on weather and climate-related physical variables during a training stage and during a trained stage, according to an embodiment. As described, the disclosed embodiments include a system for increasing the resolution of numerical simulation data of physical variables without performing expensive physical simulation calculations at high resolution. For an embodiment, the system is based on a machine learning computational workflow, for example implemented via neural network architectures, that automatically learns mappings between low-resolution numerical model variables and the distributions of these variables at higher spatial resolutions, utilizing observational sensor data, if available, to inform these mappings.

An embodiment includes a system for increasing a spatial resolution of gridded spatial-temporal data on weather and climate-related physical variables that includes a plurality of sensors, sensing physical data, and one or more computing devices connected through a network to the plurality of sensors. Memory including instructions that, when executed by the one or more computing devices, enables the system to obtain weather and climate data, the weather and climate data comprising at least one of gridded numerical simulation data having at least two spatial resolutions including at least a coarse resolution and a fine resolution, or observational data that includes at least one source of sensed physical data, wherein at least one of the gridded numerical simulation data or the observational data include weather and climate-related data, pre-process the weather and climate data, train one or more probabilistic downscaling mapping functions of the at least one of the gridded numeric simulation data having at least two spatial resolutions or the observational data comprising applying interpolation filters to successively interpolate the pre-processed weather and climate data to generate output data having a resolution that is equal to the fine resolution, and generate high-resolution physical parameters for at least one of a plurality of applications utilizing the trained probabilistic downscaling mapping functions receiving different weather and climate input data that has different times or locations than the pre-processed weather and climate data used in the training.

As shown in FIG. 11, when operating, the system performs a training of the physics-enabled downscaling system 1150. For an embodiment, the inputs to training the physics enabled AI downscaling system includes sensor data 1110, low-resolution numerical simulation data 1130, high-resolution numerical simulation data 1140, and physical constraints and domain knowledge 1120. The sensor data 1110 may include snow, wind, temperature, precipitation, vegetation cover, ground elevation, soil moisture, visibility etc. The low-resolution numerical simulation data 1130 and the high-resolution numerical simulation data 1140, may include precipitation and runoff information, temperature information, wind information, radiation information, fog information, smoke information, fire spread information, simulations of fire spread. The physical constraints and domain knowledge 1120 include, for example, information specific to atmospheric science, including convective turbulent flow, radiation transfer, etc.

Further, as shown in FIG. 11, after being trained and operating in an inference mode, the trained physics-enabled machine learning downscaling system 1160 only requires a subset of the inputs utilized in training. Specifically, for an embodiment, trained downscaling system 1160 only receives low resolution numerical simulation data 1130, and observational sensor data 1110 at one or more spatial resolutions, if available, and generates high resolution physical data grids 1170 for variables of interest.

Although specific embodiments have been described and illustrated, the embodiments are not to be limited to the specific forms or arrangements of parts so described and illustrated. The described embodiments are to only be limited by the claims.

What is claimed:

1. A method for increasing a spatial resolution of gridded spatial-temporal data on weather and climate-related physical variables, including:
    a. obtaining weather and climate data, the weather and climate data comprising at least one of gridded numerical simulation data having at least two spatial resolutions including at least a coarse resolution and a fine resolution, or observational data that includes at least one source of sensed physical data, wherein at least one of the gridded numerical simulation data or the observational data include weather and climate-related data;
    b. pre-processing the weather and climate data;
    c. training one or more probabilistic downscaling mapping functions of the at least one of the gridded numeric simulation data having at least two spatial resolutions or the observational data comprising applying interpolation filters to successively interpolate the pre-processed weather and climate data to generate output data having a resolution that is equal to the fine resolution comprising:
        executing, by a network architecture, a series of tensor operations representing a set of spatial filters comprising functions that include convolutional filters, and a set of down-sampling and up-sampling steps, nonlinear operations wherein the set of spatial filters include weights that are determined by an optimization process; and
        training the network architecture comprising performing the optimization process including calculating the weights of the set of spatial filters, comprising minimizing one or more loss function components by calculating gradients of the one or more loss function components with respect to the weights and iteratively updating the weights by applying the calculated gradients; and
    d. generating high-resolution physical parameters for at least one of a plurality of applications utilizing the trained probabilistic downscaling mapping functions receiving different weather and climate input data that has different times or locations than the pre-processed weather and climate data used in the training.

2. The method of claim 1, wherein pre-processing the weather and climate data further includes normalizing the pre-processed weather and climate data.

3. The method of claim 2, wherein pre-processing the weather and climate data, and normalizing the pre-processed weather and climate data, comprises:
    concatenating physical weather and climate inputs into channels, wherein each channel represents one physical variable, and wherein the physical inputs include the weather and climate data.

4. The method of claim 2 wherein pre-processing the weather and climate data, and normalizing the pre-processed weather and climate data, comprises:
    concatenating physical inputs into channels, wherein each channel represents one physical variable at different times, and wherein the physical inputs include the weather and climate data.

5. The method of claim 3, further comprising applying channel-specific normalization on each of the channels on a case-by-case basis depending on a specific physical variable.

6. The method of claim 1, further comprising validating the set of spatial filters after the weights have been calculated by converting low resolution input data not used during training to high resolution output data, and comparing high resolution output data to ground-truth observational or numerical data with respect to various measures error.

7. The method of claim 1, wherein the weather and climate data are combined into batches before being input to the network, wherein batches include chunks of the discrete pre-processed weather and climate data.

8. The method of claim 1, wherein the nonlinear functions include point-wise nonlinear transformations applied to every element in the series of tensor operations.

9. The method of claim 1, wherein the one or more loss function components includes one or more of a mean error, and adversarial loss, or physics constraints.

10. The method of claim 1, wherein the one or more loss function components includes physics constraints, wherein the physical constraints include at least one of measures of power spectral density, conservation of mass, conservation of momentum or conservation of energy, wherein the measures are each differentiable, and therefore efficient for calculating a gradient of the loss function with respect to the weights during training of the network architecture.

11. The method of claim 1, further comprising initializing the weights before training with a pre-established set of weights, wherein the pre-established weights are determined by a prior training of a same network architecture on a different but related set of weather and climate data, wherein the different but related set of weather and climate data includes a same physical variables at different times, locations, or resolutions.

12. The method of claim 1, wherein the observation data and numeric simulation data include time series data.

13. The method of claim 1, wherein the network architecture is established using prior knowledge of physics of the weather and climate data, wherein the network architecture constrains a model to produce a limited range of physically-feasible output.

14. A system for increasing a spatial resolution of gridded spatial-temporal data on weather and climate-related physical variables, comprising:
    a plurality of sensors, sensing physical data;
    one or more computing devices connected through a network to the plurality of sensors;
    memory including instructions that, when executed by the one or more computing devices, enables the system to:
        obtain weather and climate data, the weather and climate data comprising at least one of gridded numerical simulation data having at least two spatial resolutions including at least a coarse resolution and a fine resolution, or observational data that includes at least one source of sensed physical data, wherein at least one of the gridded numerical simulation data or the observational data include weather and climate-related data;

pre-process the weather and climate data;

e. train one or more probabilistic downscaling mapping functions of the at least one of the gridded numeric simulation data having at least two spatial resolutions or the observational data comprising applying interpolation filters to successively interpolate the pre-processed weather and climate data to generate output data having a resolution that is equal to the fine resolution comprising the executed instructions enabling the system to:

execute a series of tensor operations representing a set of spatial filters comprising functions that include convolutional filters, and a set of down-sampling and up-sampling steps, nonlinear operations wherein the set of spatial filters include weights that are determined by an optimization process; and train the network architecture comprising performing the optimization process including calculating the weights of the set of spatial filters, comprising minimizing one or more loss function components by calculating gradients of the one or more loss function components with respect to the weights and iteratively updating the weights by applying the calculated gradients; and generate high-resolution physical parameters for at least one of a plurality of applications utilizing the trained probabilistic downscaling mapping functions receiving different weather and climate input data that has different times or locations than the pre-processed weather and climate data used in the training.

15. The system of claim 14, wherein pre-processing the weather and climate data, and normalizing the pre-processed weather and climate data, includes the executed instructions enabling the system to:

concatenate physical weather and climate inputs into channels, wherein each channel represents one physical variable, and wherein the physical inputs include the weather and climate data.

16. The system of claim 14, wherein pre-processing the weather and climate data, and normalizing the pre-processed weather and climate data, includes the executed instructions enabling the system to:

concatenating physical inputs into channels, wherein each channel represents one physical variable at different times, and wherein the physical inputs include the weather and climate data.

17. The system of claim 14, wherein pre-processing the weather and climate data, and normalizing the pre-processed weather and climate data, includes the executed instructions enabling the system to:

apply channel-specific normalization on each of the channels on a case-by-case basis depending on a specific physical variable.

18. The system of claim 14, wherein the one or more loss function components includes physics constraints, wherein the physical constraints include at least one of measures of power spectral density, conservation of mass, conservation of momentum or conservation of energy, wherein the measures are each differentiable, and therefore efficient for calculating a gradient of the loss function with respect to the weights during training of the network architecture.

* * * * *